Oct. 30, 1962   J. PEARLMAN   3,060,719
TESTING PAPER TISSUES AND THE LIKE
Filed Dec. 29, 1958   2 Sheets-Sheet 2
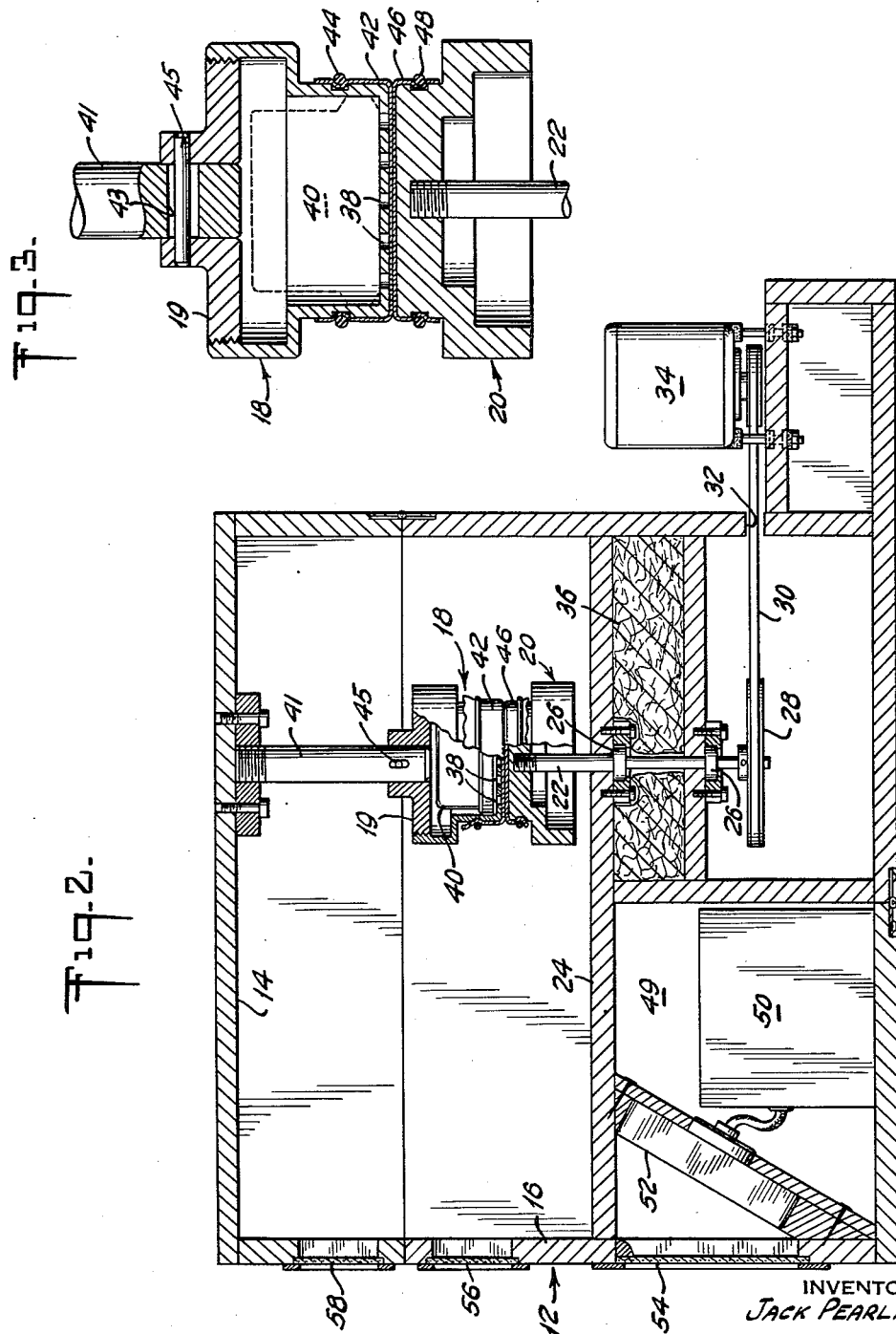
INVENTOR
JACK PEARLMAN
BY
Curtis, Morris & Safford
ATTORNEYS United States Patent Office 3,060,719
Patented Oct. 30, 1962

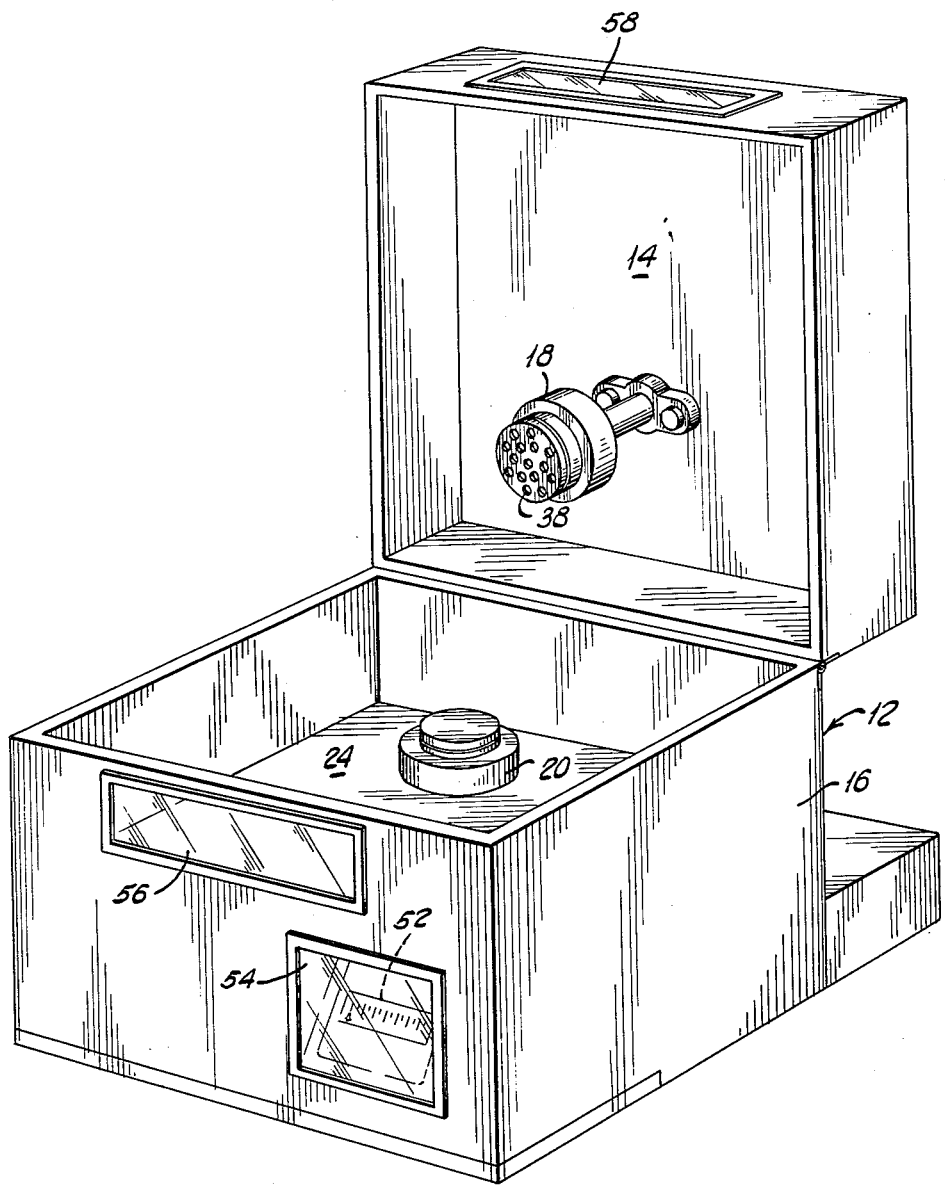

3,060,719
TESTING PAPER TISSUES AND THE LIKE
Jack Pearlman, Palatka, Fla., assignor to Hudson Pulp &
Paper Corp., New York, N.Y., a corporation of Maine
Filed Dec. 29, 1958, Ser. No. 783,232
6 Claims. (Cl. 73—7)

This invention relates to the accurate testing or measuring of a characteristic or quality of material, and more particularly to measuring the degree of softness of sheets or webs of material such as paper tissues and the like.

An object of this invention is to provide for accurately measuring the quality or a characteristic softness of a thin, pliant sheet such as a paper tissue of facial quality. Another object is to provide simple and inexpensive apparatus which can quickly and accurately determine the softness quality of a sheet of tissue and the like. Another object is to provide a method and apparatus for comparing a quality or characteristic of different samples of paper. A further object is to provide for the above with apparatus which is sturdy in construction, easy to operate and dependable in use. These and other objects will be in part obvious, and in part pointed out below.

Various important factors in the manufacture of tissue are quite variable, and they must be carefully determined and controlled to produce products having the desired qualities and characteristics. This is particularly important with respect to providing the desired softness and strength for each of the various tissue products, such as, facial tissues and toilet paper. In the past, there has been a practice of subjecting tissues to a manual "feel" test by rubbing it between two fingers of the hand. By such tests, experts determine with some measure of accuracy the relative softness of the tissue, and this is related to the tear strength. This hand testing requires skilled persons with a highly developed sense of touch and the ability to judge small differences between samples with reasonable degrees of accuracy. Such procedures are entirely dependent upon the skill and sensitivity of an individual, and extensive training and experience are required. Furthermore, the human frailities render such testing somewhat unscientific, and make it difficult to establish definite and controlled standards. The present invention eliminates the necessity for depending upon the hand or manual "feel" tests, and overcomes the difficulties attendant thereto.

In accordance with the present invention, a sample of the fragile pliant tissue is tested as to softness by rubbing it against another sample like itself, for example, and measuring the sound produced by the rubbing action. The measurement of the sound is a function of, and is related to the "softness" or "feel" quality of the tissue. This is accomplished in the illustrative embodiment of the invention by placing one sample or sheet of tissue over a knob-like head containing a sensitive microphone, placing another sheet of the tissue over a similar head opposite the first, and then rubbing the heads together with a predetermined and known degree of force and with a predetermined motion, while measuring on a meter the amount of sound generated. This procedure gives an accurate and reliable indication of the softness quality of the samples. The test is rapid, and it does not require a skilled operator, and relatively simple and inexpensive equipment may be used. The results obtained are more uniform and reliable than those previously obtained by hand testing.

A better understanding of the invention, together with a fuller appreciation of its many advantages will best be gained from the following detailed description given in connection with the accompanying drawings wherein:

FIGURE 1 is a perspective view of testing apparatus or testing unit embodying the invention;

FIGURE 2 is a cross-sectional view of the apparatus and with sheets of tissue mounted for testing; and, FIGURE 3 is an enlarged view of the tissue-holding heads of FIGURE 2.

Referring to FIGURES 1 and 2, the testing unit 10 has a housing 12, the lid 14 of which is shown open in FIGURE 1, and which is hinged to the rectangular casing 16. Mounted upon and extending downwardly from lid 14 is a relatively movable head 18 upon which is mounted a test sample in the form of a piece of tissue 19, the softness of which is to be measured. Mounted directly beneath head 18 is a relatively stationary head 20 upon which is mounted a sample 21 identical with sample 19. Head 20 is rigidly mounted upon the upper end of a vertical rotating shaft 22 which is mounted in a pair of bearings 26 and 27 which are supported by a frame 24 rigidly mounted within casing 16. Rotation is imparted to shaft 22 through a pulley 28 mounted upon and keyed to the lower end of the shaft, and a belt 30 which extends through a slot or opening 32 in the side wall of casing 16 to a pulley 33 upon the shaft of a drive motor 34. Motor 34 is rigidly mounted, as shown, upon a frame structure fixed to the exterior of casing 16. The space between the bearings 26 and 27 of shaft 22 is filled with a sound absorbing material 36 so as to insulate and deaden the sound of motor 34 and the mounting and drive elements between the motor and head 20.

As shown best in FIGURE 3, the upper head 18 has a shell 19 with a perforated cylindrical face plate 38 which forms the bottom wall for a microphone 40. The sample 19 is held taut along the bottom surface of face plate 38 by a rubber band 44 which nests into an annular groove 42 in the side wall of shell 19. Test sample 21 is similarly held taut along the upper cylindrical surface of head 20 by a rubber band 48 which nests in an annular groove 46 in the side wall of head 20.

Head 18 is supported from the top of lid 14 by a rigid vertical post 41 which has a slot 43 therein through which a pin 45 projects. Pin 45 is rigidly mounted at its ends at the hub portion of the shell 19 of head 18. Hence, head 18 is prevented from rotating, but it has limited vertical movement with respect to post 41. Therefore, when lid 14 is swung from the open position of FIGURE 1 to the position of FIGURE 2, head 18 is moved down so that it rests upon head 20, and pin 45 (see FIGURE 3) is moved up away from the bottom of slot 43. When in this position, the entire weight of head 18 is supported through the tissue samples 19 and 21 by the lower head 20. This presses the contacting surfaces of the samples together with a predetermined and constant pressure, that is, the pressure produced by the weight of head 18.

Mounted in a compartment 49 in the front lower portion of casing 16 is amplifier 50 which is connected to microphone 40 so as to receive and amplify the sound signals from the microphone. Connected to amplifier 50 is a meter 52 which may be viewed from the front of the unit (see FIGURE 1) through a window 54 in the front wall of casing 16. Hence, sound received by microphone 40 is amplified by amplifier 50 and produces a reading on meter 52. Similar windows 56 and 58 in the top front wall of casing 16 and lid 14, respectively, permit the viewing of the heads 18 and 20 when the lid is closed.

During operation of the unit, motor 34 rotates the lower head 20 at a predetermined or controlled constant speed, and this rubs the surface of the tissue sample 21 against the surface of the facial tissue sample 19. The rubbing produces sound which is picked up by microphone 40, and the sound signals are amplified so as to produce a signal reading on meter 52. The magnitude and quality of the sound depend upon the physical characteristics of the tissue samples, and constitute a scientific and accurate equivalent of the "softness" function, such as has been sought by "feel" tests, as discussed above. By controlling the rate of rotation of head 20 and the pressure exerted by head 18, very uniform results are obtained in the testing of samples for their physical characteristics. The weight of head 18 may be readily changed so as to change the pressure exerted upon the contacting surfaces of the samples. Amplifier 50 may also be changed or adjusted so as to amplify certain tones more than others, and this may be particularly advantageous when testing certain samples. It has been pointed out above that the speed of motor 34 may also be changed. With the arrangements shown, the operation of the instrument is not affected by external noises and vibrations. The operation is simple, and may be carried on at a rapid rate. The operator may view the heads through the front windows during the operation to insure that the samples are properly in place. The reading may be taken substantially instantaneously after the motor has reached its set speed, with the samples on the heads and with the lid closed. When the lid is open, the heads are completely exposed and conveniently positioned so that samples may be secured in place and removed.

The invention contemplates that the machine and the mode of operation will be modified to adapt it to use in testing different materials, and also to meet various special conditions of use. In the illustrative embodiment, two samples of the material being tested are rubbed together, and this has particular advantages. However, for certain products and certain conditions of operation, a single sample of the product may be rubbed against a test surface of another material to produce the sound or noise. In the present application, the term "sound" and "noise" have been used to identify sound and noise vibrations which are picked up and amplified to produce readings upon a meter. The invention contemplates that other means may be used for indicating the quality or magnitude of sound or vibrations produced by the rubbing action.

As many possible embodiments may be made in the above invention and as many changes might be made in the embodiments above set forth, it is to be understood that all matter hereinbefore set forth or shown in the accompanying drawings is to be interpreted as illustrative and not in the limiting sense.

I claim:

1. A testing instrument for measuring the physical qualities of materials of the character described, said instrument comprising a box-like housing having soundproof walls and a hinged top, a first member depending from said top to support a piece of material to be tested, a second member rotatably mounted within said housing, said members presenting flat surfaces which mate with each other when said top is closed, motor means to move one of said members relative to the other, said members being movable toward each other to mate surfaces of the two samples whereby the mating surfaces are subjected to a predetermined surface pressure, means to impart relative movement between said mating surfaces whereby said mating surfaces rub each other and produce sound, and means responsive to the sound thus produced upon movement of said members to indicate a physical condition of the samples.

2. A testing instrument as described in claim 2, wherein said means responsive to the sounds comprises, a microphone in one of said members, an amplifier connected to amplify signals from said microphone and a meter connected to indicate the magnitude of the amplified sound signals in terms of a softness function of the samples.

3. Apparatus for determining the softness quality of materials such as paper tissue and the like comprising, a housing having walls which substantially exclude external noise, a pair of heads mounted within said housing and each adapted to receive a test sample of said material, said heads being positioned to hold surfaces of the two test samples together in mating relationship, means to continuously move one of said heads with respect to the other whereby said surfaces are rubbed together, a microphone, and amplifier-indicating means connected to said microphone for indicating the volume of sound generated by said rubbing.

4. The apparatus as described in claim 3 wherein said microphone is mounted within one of said heads and each of said heads has a plane face opposed to the plane face of the other head upon which the respective samples are mounted.

5. The apparatus as described in claim 3, wherein said microphone is movably mounted within one of said heads and wherein the other of said heads is rotatable, and an electric motor to rotate the rotatable head mounted in sound-proofed relationship with respect to said microphone.

6. A testing instrument for measuring the surface texture of materials such as paper tissue and the like, said instrument comprising a frame, a head mounted on said frame for continuous rotation, said head being positioned in rubbing relation with an opposite portion of said frame, clamping means to secure a sample of material between said head and opposite frame portion, motor means to continuously rotate said head, microphone means to pick up the sound of rubbing of said sample, and amplifier-indicating means connected to said microphone for giving a numerical indication of the sound generated by the rubbing of said sample of material.

References Cited in the file of this patent
UNITED STATES PATENTS

| | | |
|---|---|---|
| 2,036,315 | Barnhart et al. | Apr. 7, 1936 |
| 2,721,473 | Allen et al. | Oct. 25, 1955 |
| 2,752,781 | Thorsen | July 3, 1956 |
| 2,922,303 | Veneklassen et al. | Jan. 26, 1960 |